US012571393B2

(12) United States Patent
Carboneri et al.

(10) Patent No.: US 12,571,393 B2
(45) Date of Patent: Mar. 10, 2026

(54) VACUUM PUMPING SYSTEM HAVING AN OIL-LUBRICATED VACUUM PUMP

(71) Applicant: Agilent Technologies, Inc., Santa Clara, CA (US)

(72) Inventors: Roberto Carboneri, Turin (IT); Andrea Lepore, Cassino (IT); Andrea Bertallot, Cavour Torino (IT); Giovanni Iannucci, Casserta (IT)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/718,281

(22) Filed: Apr. 11, 2022

(65) Prior Publication Data

US 2022/0235772 A1 Jul. 28, 2022

Related U.S. Application Data

(62) Division of application No. 16/507,972, filed on Jul. 10, 2019, now abandoned.

(30) Foreign Application Priority Data

Jul. 19, 2018 (EP) .................................... 18184580

(51) Int. Cl.
*F04C 29/02* (2006.01)
*F04C 23/02* (2006.01)
(Continued)

(52) U.S. Cl.
CPC .............. *F04C 29/02* (2013.01); *F04C 23/02* (2013.01); *F04C 25/02* (2013.01); *F04C 27/02* (2013.01);
(Continued)

(58) Field of Classification Search
CPC ...... F04B 17/03; F04B 35/045; F04C 18/344; F04C 23/02; F04C 23/008; F04C 25/02;
(Continued)

(56) References Cited

U.S. PATENT DOCUMENTS 4,120,621 A 10/1978 Pikul
4,384,226 A 5/1983 Sato et al.
(Continued)

FOREIGN PATENT DOCUMENTS

CN 202811372 U 3/2013
CN 103595165 A 2/2014
(Continued)

OTHER PUBLICATIONS

JP-2014039401-A (same document as the corresponding foreign patent document) (Year: 2014).*
(Continued)

*Primary Examiner* — Essama Omgba
*Assistant Examiner* — Joseph S. Herrmann

(57) ABSTRACT

A vacuum pumping system includes an oil-lubricated vacuum pump, including a stationary pump stator and a rotatable pump rotor, and a motor, including a stationary motor stator and a rotatable motor rotor cooperating with each other for driving in rotation the pump rotor. The motor further includes an oil-tight unit including a metal jacket enclosing the motor rotor and forming a container intended to collect and keep inside the motor any oil leaking from the pump.

14 Claims, 6 Drawing Sheets

(51) Int. Cl.

| | | |
|---|---|---|
| *F04C 25/02* | (2006.01) | |
| *F04C 27/02* | (2006.01) | |
| *F04C 18/344* | (2006.01) | |
| *F04C 29/00* | (2006.01) | |
| *H02K 5/12* | (2006.01) | |

(52) U.S. Cl.
CPC ........ *F04C 18/344* (2013.01); *F04C 29/0085* (2013.01); *H02K 5/12* (2013.01)

(58) Field of Classification Search
CPC ........ F04C 27/02; F04C 29/02; F04C 29/028; F04C 29/0085; F04C 2240/40; F04D 13/0606–0626; H02K 5/128; H02K 5/00; H02K 5/10; H02K 5/12; H02K 5/1285; H02K 5/132; H02K 5/04; H02K 9/19; H02K 15/10; H02K 15/102; H02K 15/12
USPC ......................................................... 310/43
See application file for complete search history.

(56) References Cited

U.S. PATENT DOCUMENTS

| | | | | |
|---|---|---|---|---|
| 4,797,071 | A | 1/1989 | Veyrat | |
| 5,154,587 | A | 10/1992 | Mori et al. | |
| 5,263,829 | A | 11/1993 | Gergets | |
| 5,767,606 | A | 6/1998 | Bresolin | |
| 5,779,453 | A | 7/1998 | Nagayama et al. | |
| 5,923,108 | A | 7/1999 | Matake et al. | |
| 6,002,185 | A | 12/1999 | Nakao et al. | |
| 6,471,494 | B1 | 10/2002 | Miura et al. | |
| 6,541,884 | B1 | 4/2003 | Croci | |
| 6,604,917 | B2 | 8/2003 | Casper et al. | |
| 6,644,942 | B2 | 11/2003 | Rival et al. | |
| 6,673,463 | B1 * | 1/2004 | Onishi | H02K 15/0006 428/458 |
| 6,700,273 | B1 * | 3/2004 | Ojima | F04C 18/00 310/43 |
| 6,884,043 | B2 * | 4/2005 | Kimberlin | F04C 14/06 417/357 |
| 7,393,192 | B2 | 7/2008 | Wood et al. | |
| 8,177,528 | B2 | 5/2012 | Petersen | |
| 8,202,072 | B2 | 6/2012 | Schneider et al. | |
| 9,429,166 | B2 * | 8/2016 | Inada | H02K 5/12 |
| 9,614,411 | B2 * | 4/2017 | Hozumi | F04D 25/06 |
| 10,352,284 | B2 | 7/2019 | Kleindl et al. | |
| 2002/0150484 | A1 | 10/2002 | Rival et al. | |
| 2004/0010779 | A1 | 1/2004 | Di | |
| 2004/0108779 | A1 | 6/2004 | Boettger et al. | |
| 2005/0260082 | A1 * | 11/2005 | Conrad | F04C 25/02 417/410.3 |
| 2013/0272904 | A1 * | 10/2013 | Hozumi | H02K 5/128 417/360 |
| 2022/0235772 | A1 * | 7/2022 | Carboneri | F04C 29/0085 |

FOREIGN PATENT DOCUMENTS

| | | | | |
|---|---|---|---|---|
| CN | 103649464 | A | 3/2014 | |
| EP | 2729667 | B1 | 6/2017 | |
| JP | 2005184958 | A | 7/2005 | |
| JP | 2006342721 | A | 12/2006 | |
| JP | 4435556 | B2 * | 3/2010 | |
| JP | 2014039401 | A * | 2/2014 | F04C 15/008 |
| WO | 0238964 | A1 | 5/2002 | |

OTHER PUBLICATIONS

JP-4435556-B2 (same document as the corresponding foreign patent document) (Year: 2010).*

Epo, et al., Extended European Search Report mailed on Jan. 17, 2019, Application No. 18184580.1; 6 pages.

Chinese office action and search report dated Dec. 19, 2023 for Application No. 201910588221.8; 9 pages.

Epo, et al., Extended European Search Report dated May 7, 2024 for Application No. 24153707.5; 7 pages.

* cited by examiner

VACUUM PUMPING SYSTEM HAVING AN OIL-LUBRICATED VACUUM PUMP

RELATED APPLICATIONS

This application is a divisional under 35 U.S.C. § 121 of U.S. patent application Ser. No. 16/507,972, filed Jul. 10, 2019; which claims priority to European Patent Application No. EP 18184580.1, filed Jul. 19, 2018, titled "VACUUM PUMPING SYSTEM HAVING AN OIL-LUBRICATED VACUUM PUMP," the contents of each of which are incorporated by reference herein in their entireties.

TECHNICAL FIELD

The present invention relates to vacuum pumping systems and, more particularly, it concerns a vacuum pumping system having an oil-lubricated vacuum pump.

BACKGROUND

Vacuum pumps are used to achieve vacuum conditions, i.e. for evacuating a chamber (so-called "vacuum chamber") and establishing sub-atmospheric pressure conditions in said chamber. Many different kinds of vacuum pumps, having different structures and operating principles, are known and each time a specific vacuum pump is to be selected according to the needs of a specific application, namely according to the degree of vacuum that is to be attained in the corresponding vacuum chamber.

In general, a vacuum pump comprises a pump casing, in which one or more pump inlets and one or more pump outlets are provided, and pumping elements, arranged in said pump casing and configured for pumping a gas from said pump inlet(s) to said pump outlet(s): by connecting the pump inlet(s) to the vacuum chamber, the vacuum pump allows the gas in the vacuum chamber to be evacuated, thus creating vacuum conditions in said chamber.

More specifically, in a kind of vacuum pumps, the pumping elements comprise a stator defining a pumping chamber and a rotor rotatable in said pumping chamber, and the stator and the rotor cooperate with each other for pumping the gas from the pump inlet(s) to the pump outlet(s). In such vacuum pumps, the rotor is generally mounted to a rotating shaft which is driven by a motor, namely by an electric motor.

Even more specifically, vacuum pumping systems are known in which the vacuum pump is connected to an oil tank, whereby oil can be transferred from the oil tank to the vacuum pump, and in particular to the pumping chamber, for acting as coolant and lubricating fluid and for sealing the chamber. Among such systems, those using rotary vane vacuum pumps can be mentioned, and the following description will refer to a system of that kind.

A conventional vacuum pumping system using a rotary vane vacuum pump is shown in FIG. 1 and is generally denoted 10.

Pumping system 10 essentially comprises a rotary vane vacuum pump 20 and an electric motor 30 for driving pump 20.

Pump 20 comprises a pump casing 21 in which one or more pump inlets and one or more pump outlets (not shown in the Figure) are defined. Pump casing 21, which is refined so as to act also as pump stator, internally defines a pumping chamber in which a pump rotor 23 eccentrically rotates. Rotor 23 is fastened to or integral with a pump shaft 24 driven in rotation by motor 30 and is provided with one or more radially slidable vanes 25 (only one being visible in the drawing) that, during rotation of the rotor 23, move in contact with the inner walls of the pumping chamber. As known, in such kind of pump, oil is introduced into the pumping chamber for lubricating and cooling the pump and separating the regions at different pressures.

Motor 30 in turn comprises a casing 31, fastened to pump casing 21 and enclosing a motor stator 32 and a motor rotor 33. Motor stator 32 and motor rotor 33 cooperate with each other so as to drive pump rotor 23 into rotation by means of a drive shaft 34, associated with motor rotor 33. Drive shaft 34 can be coupled to pump shaft 24 or it can be made as an integral unit with pump shaft 24 and pump rotor 23, as shown in the Figure. End walls 35, 36 close a chamber housing motor rotor 33 and rotatably support, in association with suitable rolling bearings, the end portions of shaft 34.

To prevent oil and possibly toxic gases present in the pumping chamber from passing to motor 30 and escaping in the environment through the motor casing 31, a dynamic seal 40, typically a lip seal, is provided around shaft 34 between motor casing 31 and pump casing 21. The dynamic seal 40 also prevents dust from entering the pumping chamber.

U.S. Pat. No. 6,644,942 discloses a pumping system in which the motor rotor and stator are accommodated in a resin jacket preventing lubricant present in a chamber adjacent to the motor module from leaking into the motor module itself. Yet, the prior art is concerned with a dry vacuum pump, in particular a dual-rotor pump with two parallel rotors coupled via a gear assembly located in a casing containing oil, and the chamber containing oil is not the pumping chamber, but is the casing housing the gear assembly. This pumping system still needs the provision of a lip seal around the shaft, at the wall separating the two chambers to be isolated.

Dynamic seals are rather expensive. Moreover, in the case of vacuum pumping systems comprising a rotary vane vacuum pump, these dynamic seals are the main cause of oil leaks during operation of the pump.

SUMMARY

To address the foregoing needs, in whole or in part, and/or other needs that may have been observed by persons skilled in the art, the present disclosure provides methods, processes, systems, apparatus, instruments, and/or devices, as described by way of example in implementations set forth below.

It is an object of the invention to provide a pumping system using an oil-lubricated vacuum pump, which has a more effective sealing system for preventing oil leaks from the pumping chamber.

It is another object of the invention to provide a pumping system using an oil-lubricated vacuum pump, which does not require dynamic seals between the vacuum pump and the motor, and thus can be made in a more cost-effective manner than the prior art systems.

These objects may be attained by a pumping system as disclosed herein.

More particularly, the invention provides a vacuum pumping system comprising an oil-lubricated vacuum pump and an electric motor driving the pump, in which the system further comprises an oil-tight unit arranged to enclose at least a portion of the motor rotor and forming at least part of a container intended to collect and keep inside the motor any oil leaking from the pump.

Advantageously, the oil-tight unit has at least a portion clamped between a motor casing and a pump casing.

In a first embodiment of the invention, said unit comprises a substantially cylindrical jacket made of sheet metal, enclosing the whole of the rotor and forming said container.

According to a preferred feature of the first embodiment of the invention, the jacket has a side wall located in an air gap separating the motor rotor from the motor stator, is open at a first end, where it is clamped between the motor casing and the pump casing, and is closed, at a second end opposite the first end, by a bottom wall accommodated inside the motor casing.

According to another preferred feature of this embodiment, the open end of said jacket has a rim that projects radially outwards and forms the jacket portion clamped between the motor casing and the pump casing. In this case, a static seal is provided between a surface of said rim facing the pump casing and the confronting surface of the pump casing.

In a second embodiment of the invention, said unit still comprises a substantially cylindrical jacket forming said container. Like in the first embodiment, the jacket encloses the whole of the rotor, has a side wall located in an air gap separating the motor rotor from the motor stator, and is open at a first end, where it is clamped between the motor casing and the pump casing. In this second embodiment the jacket is made of a non-metallic material, preferably an oil-resistant, electrically insulating thermosetting or thermoplastic resin, and the side wall is a very thin layer of the resin.

According to a preferred feature of the second embodiment of the invention, the jacket is provided, at both ends, with bases having a larger diameter than the side wall and protruding radially outwards from the side wall, and the base provided at the open end engages in oil-tight manner a complementarily shaped axial recess formed in the pump casing.

According to another preferred feature of this embodiment, in the radially protruding portions of said bases, the surfaces turned towards each other are shaped so as to define annular circumferential axial recesses accommodating opposite axial ends of the motor stator.

Advantageously, the circumferential axial recesses are radially delimited towards the outside of the motor by a respective annular axial projection located between the motor stator and the motor casing and, towards the inside of the motor, by a thickened end portion of the side wall of the jacket.

Thanks to the use of a jacket made of resin and having a very thin side wall, there is no need of increasing the air gap between the stator and the rotor of the motor in order to accommodate a metal jacket like that used in the first embodiment and to take into account its thermal expansion.

In a third embodiment of the invention, said unit comprises first and second disc-shaped components accommodating opposite axial end portions of both the motor rotor and the motor stator and forming, together with the motor stator, the container intended to collect and keep inside the motor any oil leaking from the pump. The first component forms the portion of the unit clamped between the motor casing and the pump casing and engages in oil-tight manner a complementarily shaped axial recess formed in the pump casing.

The two components are made of a non-metallic material, preferably an oil-resistant, electrically insulating thermosetting or thermoplastic resin.

According to a preferred feature of this second embodiment, both the first and the second component have, on their face turned towards the other component, a circumferential axial recess accommodating a respective axial end of the motor stator.

Advantageously, the circumferential axial recesses are radially delimited towards the outside of the motor by a respective first annular axial projection located between the motor stator and the motor casing and, towards the inside of the motor, by a respective second annular axial projection located between the motor stator and the motor rotor.

Having a "container" that is located between the motor stator and the motor casing solves the problems of noise and vibrations that can affect, during operation, a pumping system having a metal jacket located in the air gap between the motor stator and the rotor. Moreover, there is no need to increase the radial size of the air gap in order to allow the insertion of the jacket and to take into account the thermal expansion thereof.

In the second and third embodiments, the base of the jacket opposite the open end and the second disc-shaped component, respectively, can be wholly accommodated inside the motor casing. In the alternative, their surfaces turned away from the motor can have a conical profile at least partially projecting outside the motor casing. Such conical surface can then be provided with cooling fins.

The embodiments in which the jacket base or the second component partly come out from the motor casing allow a better thermal dissipation than the embodiments in which said elements are wholly accommodated inside the motor casing, since the jacket base or the second component can directly receive the air flow created by an external cooling system of the pumping system. Moreover, the provision of the cooling fins allows increasing the cooling surface and having a more effective circulation of the external flow of cooling air.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

In FIGS. 2 to 6, the same reference numerals as in FIG. 1 have been used to denote the parts of the pump and the motor.

DETAILED DESCRIPTION

Figure 1:
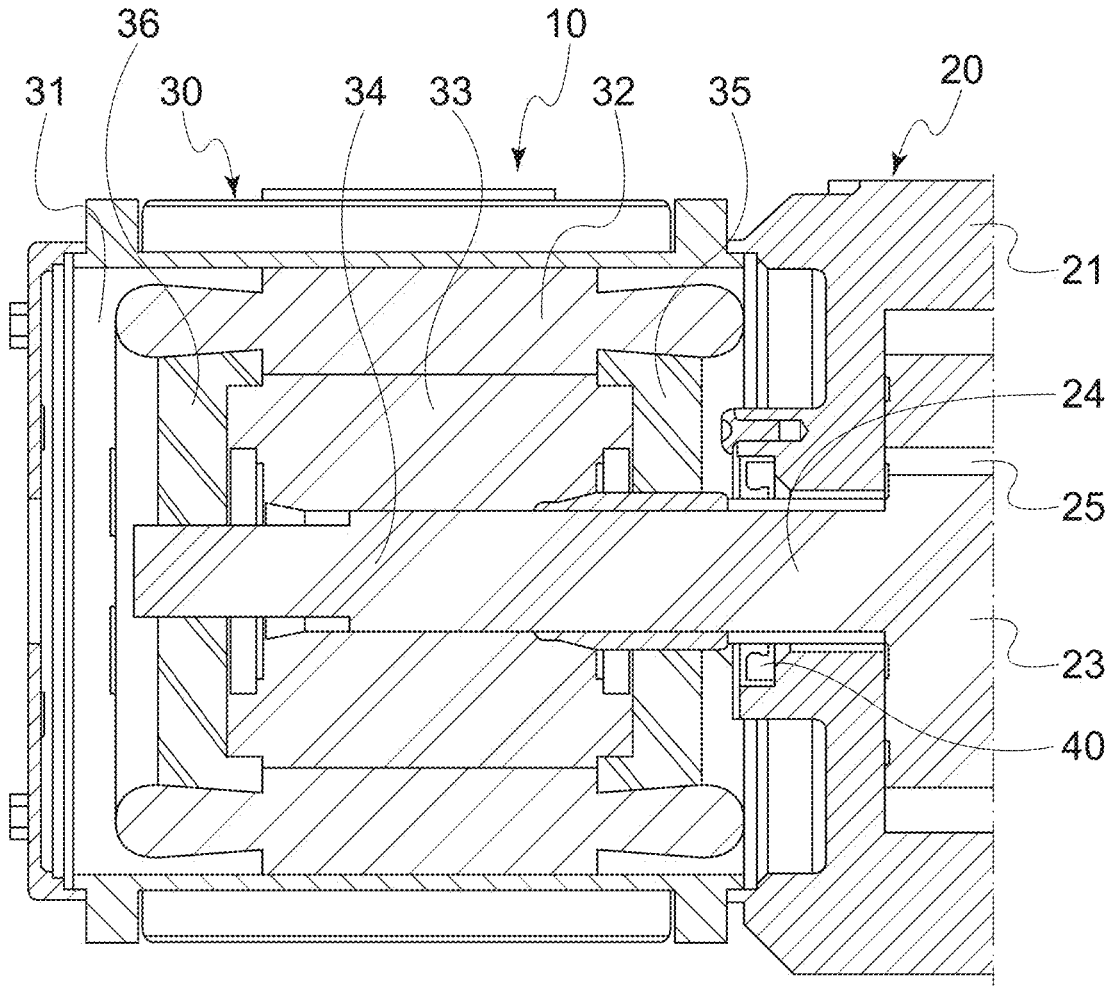
FIG. 1 is a longitudinal sectional view of part of a pumping system of the prior art.
Figure 2:
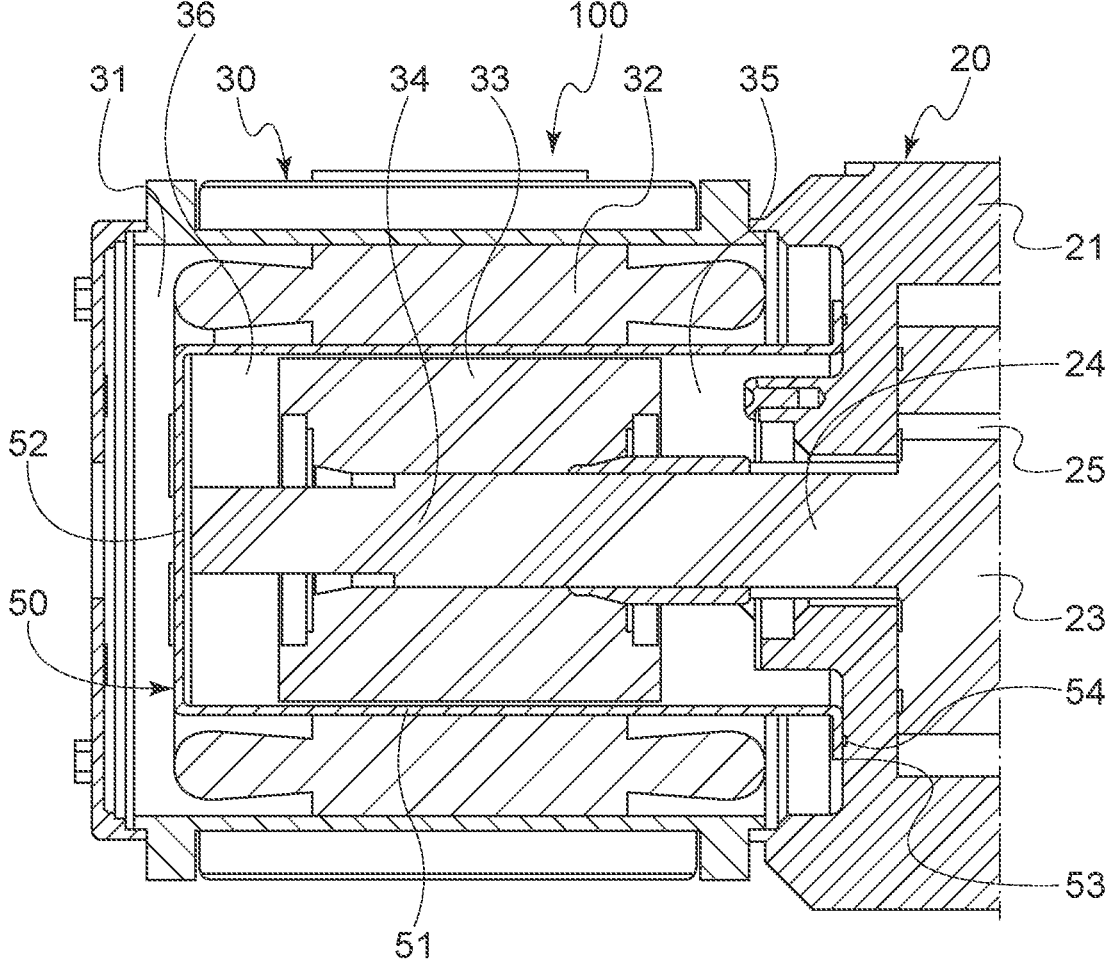
FIG. 2 is a longitudinal sectional view, similar to FIG. 1, of part of a pumping system according to a first embodiment of the invention.

FIG. 2 shows a first embodiment of a pumping system 100 according to the invention. In order to provide a more efficient sealing of motor 30 against oil leakage from the pumping chamber, a sheet-metal jacket 50 is provided which encloses motor rotor 33 and is clamped at one end between motor casing 31 and pump casing 21.

Jacket 50 is a substantially glass-shaped (or cup-shaped, or can-shaped) element, i.e. a substantially cylindrical element open at one end (the end clamped between motor casing 31 and pump casing 21), and has a side wall 51 located in the air gap between stator 32 and rotor 33 of motor 30. The open end surrounds the corresponding end wall 35 of the rotor chamber, and bottom wall (or base) 52 opposite the open end is arranged internally of motor casing 31. The open end of jacket 50 has a rim 53 projecting radially outwards, and such rim 53 is the portion of jacket 50 clamped between motor casing 31 and pump casing 21. In order to ensure oil tightness between pump 20 and motor 30, a sealing gasket 54, in particular an O-ring, is provided between rim 53 and the confronting surface of pump casing 21.

The provision of jacket 50 and O-ring 54 results in any oil leaking from the pump environment being collected within jacket 50. As it can be readily appreciated by the skilled in the art, a static seal like O-ring 54 is much less prone to failures than dynamic seal 40 of the prior art. The provision of a jacket 50 collecting any possible oil leak moreover prevents escape of oil (or any other unwanted substance, like gases etc. developed or present for some reason in the pump 20) and dispersion thereof in the environment.

The provision of sheet-metal jacket 50 and the associated O-ring 54 overcomes the problems connected with using a lip seal, but it is open to improvements as far as some aspects are concerned, in particular:

since metal jacket 50 is located between stator 32 and rotor 33 of motor 30, it can originate noise and vibrations during operation of pumping system 100;

an increase of the radial size of the air gap may be required, to allow insertion of jacket 50 itself and to take into account the thermal expansion thereof, thus entailing an increase of the radial size of the whole pumping system 100.

Figure 3:
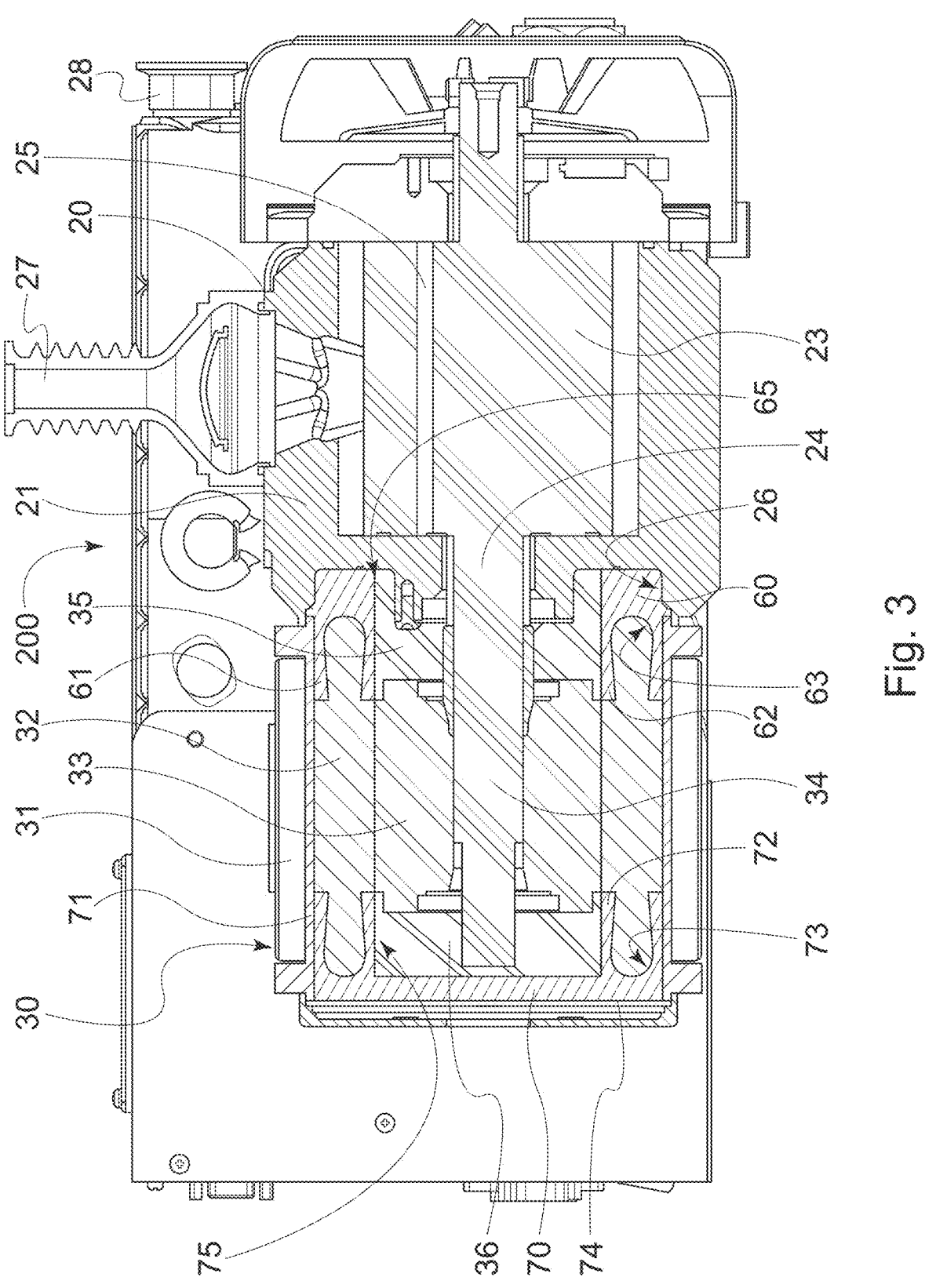
FIG. 3 is a longitudinal sectional view of a pumping system according to a second embodiment of the invention.
Figure 4:
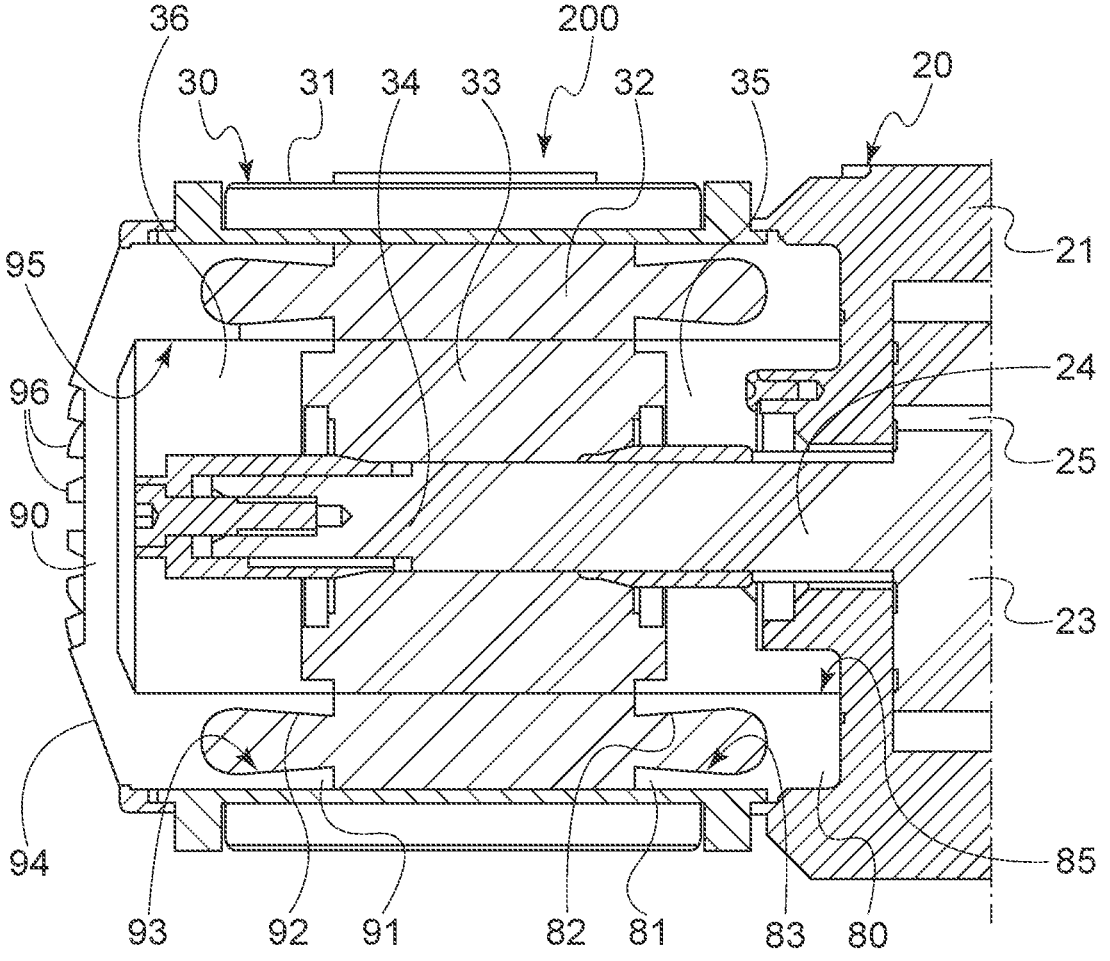
FIG. 4 is a longitudinal sectional view, similar to FIG. 2, of part of a pumping system according to a variant of the embodiment shown in FIG. 3.

Such improvements are achieved by system 200 shown in FIGS. 3 and 4.

More specifically, in the embodiment of FIG. 3, a pair of disc-shaped components 60, 70 are provided, which are made of a non-metallic material, in particular a leak-proof, oil-resistant and electrically insulating thermoplastic or thermosetting resin, and are configured so as to accommodate opposite axial ends of motor stator 32 and motor rotor 33. With such an arrangement, components 60, 70 form, together with motor stator 32, a sort of "container" collecting any oil leaking from pump 20 and keeping such oil within motor 30.

Component 60 is clamped between pump casing 21 and motor casing 31 and fits in oil-tight manner in a complementarily shaped recess 26 provided in the confronting surface of pump casing 21. A central opening 65 in component 60 accommodates end wall 35 of the rotor chamber. On its surface turned towards component 70, component 60 has two substantially parallel annular axial projections 61, 62 defining an annular axial recess 63 intended to receive one end of stator 32. Outer annular projection 61 is clamped between motor stator 32 and motor casing 31, and inner annular projection 62 is clamped between motor stator 32 on the one side and motor rotor 33 and end wall 35 on the other side.

Component 70 has a central hollow 75 (or possibly a central opening, like component 60) accommodating end wall 36 of the rotor chamber. On its surface turned towards component 60, component 70 has two substantially parallel annular axial projections 71, 72 defining an axial annular recess 73 intended to receive the other end of stator 32. Similarly to projections 61, 62, outer annular projection 71 is clamped between motor stator 32 and motor casing 31, and inner annular projection 72 is clamped between motor stator 32 on the one side and motor rotor 33 and end wall 36 on the other side. Reference 74 denotes the outer surface (i.e. the surface turned away from the motor) or base of component 70, which, in the embodiment shown in FIG. 3, is flat so that component 70 is wholly housed within motor casing 31.

The Figure also shows gas inlet and outlet 27, 28, as well as some details of the external body of pumping system 200.

The shape of components 60 and 70 and the engagement of component 60 within recess 26 in pump casing 21 ensure oil tightness without the need to use a sealing gasket like O-ring 54. Moreover, the components are clamped between stator 32 and casing 31 of motor 30, thus no problems of vibrations and noise arise because of the rotation of rotor 33. At the same time, there is no need to increase the air gap between stator 32 and rotor 33 of motor 30, as required in the embodiment shown in FIG. 2 in order to accommodate metal jacket 50 and to take into account its thermal expansion. A proper choice of the resin also allows improving the thermal dissipation characteristics not only over the prior art, but also over the solution with metal jacket shown in FIG. 2.

A further improvement is obtained by the configuration of system 200 shown in FIG. 4. Like in the embodiment of FIG. 3, a pair of disc-shaped components 80, 90 are provided, which are made of a non-metallic material, in particular a leak-proof, oil-resistant and electrically insulating thermoplastic or thermosetting resin, and are configured so as to accommodate opposite axial ends of motor stator 32 and motor rotor 33. Thus, also components 80, 90 form, together with motor stator 32, a sort of container collecting any oil leaking from pump 20 and keeping such oil within motor 30.

The first disc-shaped component 80 is identical to component 60 shown in FIG. 3 and its elements are denoted by reference numerals corresponding to those used in FIG. 3, yet beginning with digit 8 instead of with digit 6. The second disc-shaped component 90 differs from component 70 shown in FIG. 3 only in respect of the configuration of its base 94, which, instead of being flat like base 74 of component 70, has a surface with conical profile (more particularly, shaped as a frustum of a cone) on its side turned away from motor 30, such that base 94 projects outside motor casing 31. Cooling fins 96 are formed on the portion of base 94 located outside casing 31. The remaining elements of component 90 are identical to those of component 70 and they are denoted by reference numerals corresponding to those used in FIG. 3, yet beginning with digit 9 instead of with digit 7.

Component 90 having a base 94 partly coming out from motor casing 31 allows a better thermal dissipation than component 70 wholly accommodated inside motor casing 31, since base 94 can directly receive the air flow created by the external cooling system (not shown) of pumping system 200. The provision of cooling fins 96 in the portion of base 94 projecting outside motor casing 31 allows increasing the cooling surface and having a more effective circulation of the external cooling air flow.

Figure 5:
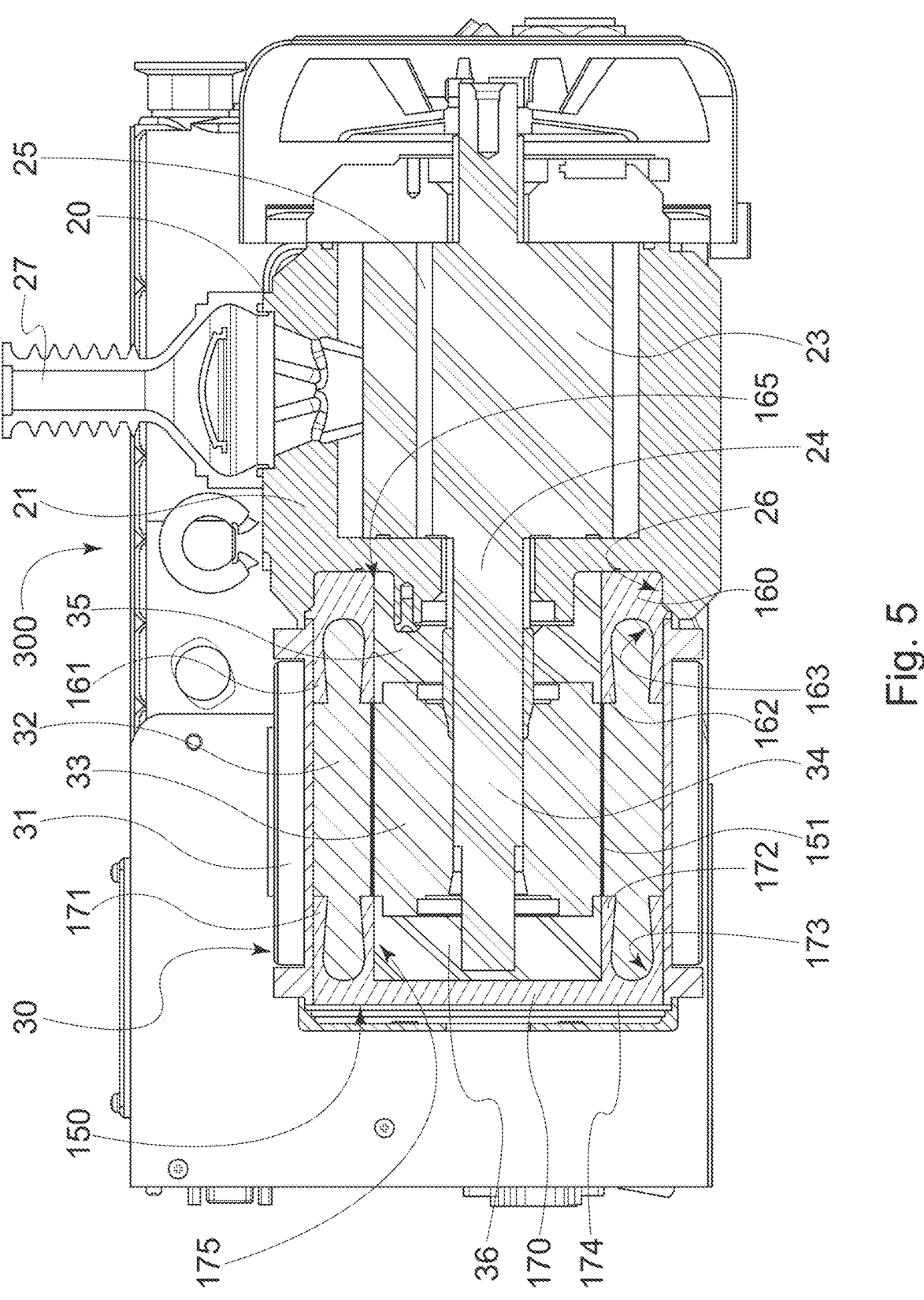
FIG. 5 is a longitudinal sectional view, similar to FIG. 3, of a pumping system according to a third embodiment of the invention.
Figure 6:
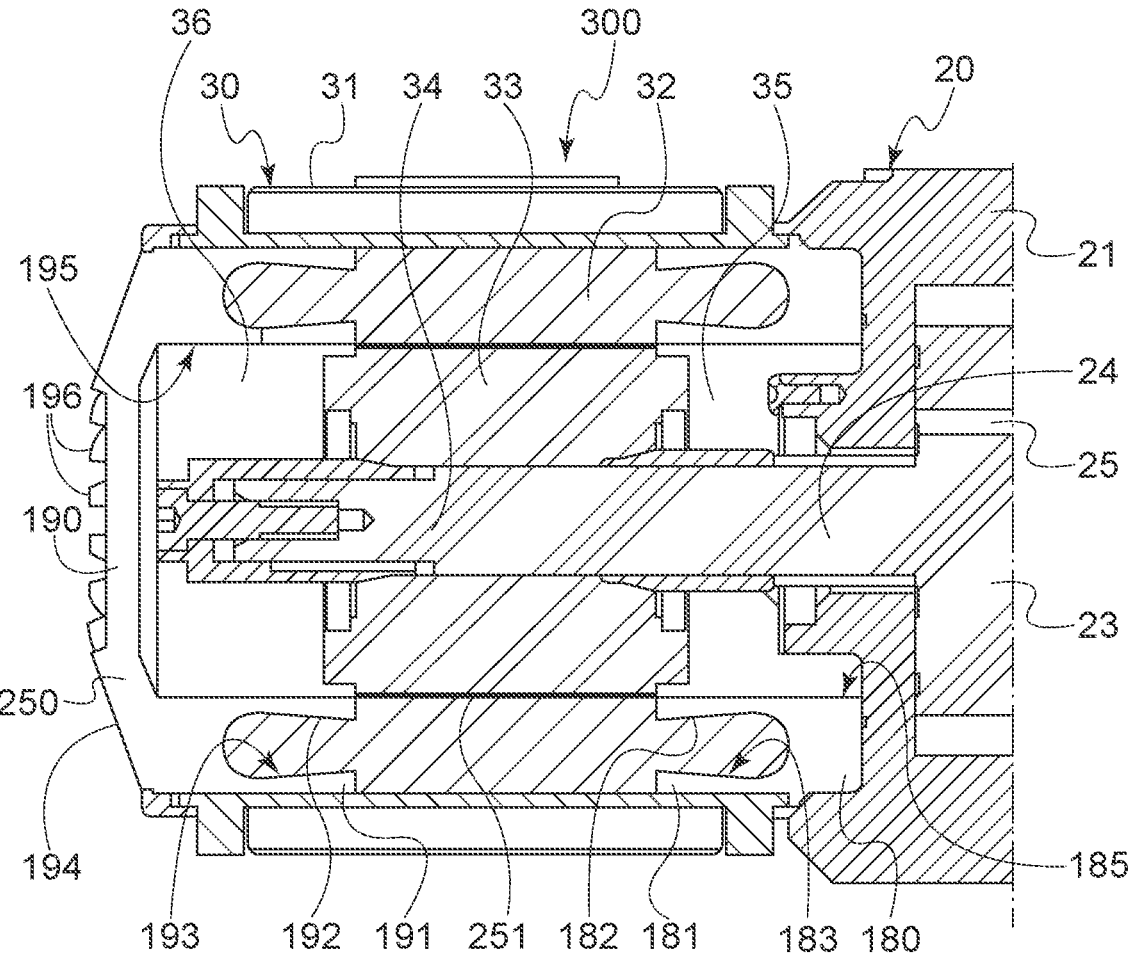
FIG. 6 is a longitudinal sectional view, similar to FIG. 4, of part of a pumping system according to a variant of the embodiment shown in FIG. 5.

FIGS. 5 and 6 show an oil-lubricated vacuum pumping system 300 according to a third embodiment of the invention. In FIGS. 5 and 6, elements corresponding or functionally equivalent to elements depicted in FIGS. 3 and 4, respectively, are denoted by the same reference numerals preceded by digit 1.

More specifically, in the embodiment of FIG. 5, the container intended to collect and keep inside the motor 30 any oil leaking from the pump 20 includes a glass-shaped, oil-tight jacket 150, configured so as to accommodate both the rotatable motor rotor 33 and the axial ends of the stationary motor stator 32 of the motor 30 and made, like the components of the system 200, of a non-metallic material, in particular a leak-proof, oil-resistant and electrically insulating thermoplastic or thermosetting resin. The jacket 150 is glass-shaped in that it is shaped like a container having an open end (the right end in FIG. 5) and an axially opposite closed end (the left end in FIG. 5).

The jacket 150 has a side wall 151 consisting of a thin resin layer located in the air gap between the motor stator 32 and the motor rotor 33 of the motor 30, and two bases 160, 170, having a larger diameter than the side wall 151, so that the bases 160, 170 protrude radially outwards from the side wall 151. The base 160 at the open end of the jacket 150 has a central opening 165 accommodating the corresponding closing wall (or end wall) 35 of the rotor chamber, is clamped between the pump casing 21 and the motor casing 31 and its surface turned towards pump casing 21 is configured so as to fit in oil-tight manner in a complementarily shaped recess 26 provided in the confronting surface of the pump casing 21. The other base 170 is located axially adjacent to an axial end of the drive shaft 34 (the left end of the drive shaft 34 in FIG. 5) has a central hollow 175 (or possibly a central opening, like base 160) accommodating the closing wall (or end wall 36) of the rotor chamber. The motor casing 31 includes a casing axial wall surrounding the rotor 32 and a casing end wall with a casing end wall inside surface facing the base 170 and the motor rotor 33.

In the radially protruding portions of bases 160, 170, the surfaces turned towards each other are shaped so as to define annular axial recesses 163, 173, respectively, intended to accommodate the opposite axial ends of the motor stator 32. More particularly, the recess 163 is defined between an edge 161 of the base 160, axially projecting towards the base 170 and clamped between the motor stator 32 and the motor casing 31, and a thickened end portion 162 of the side wall 151. Similarly, the recess 173 is defined between an edge 171 of the base 170, axially projecting towards the base 160 and clamped between the motor stator 32 and the motor casing 31, and a thickened end portion 172 of the side wall 151. Reference 174 denotes the base outer surface (i.e. the surface turned away from the motor 30) of the base 170. In the embodiment shown in FIG. 5, the base outer surface 174 of the base 170 is flat and the base 170 is wholly housed within the motor casing 31. The base outer surface 174 faces the casing end wall inside surface.

The shape of jacket 150, with base 160 engaging recess 26 in pump casing 21, ensures oil tightness without the need to use a sealing gasket like O-ring 54. Moreover, since jacket 150 is made of resin and its side wall 151 is very thin, there is no need of increasing the air gap between stator 32 and rotor 33 of motor 30 to accommodate a metal jacket like jacket 50 (FIG. 2) and to take into account its thermal expansion. Moreover, no problems of vibrations and noise exist. At the same time, like in the embodiment of FIGS. 3 and 4, a proper choice of the resin also allows improving the thermal dissipation characteristics not only over the prior art but also over the solution with metal jacket shown in FIG. 2.

Referring now to FIG. 6, the container intended to collect and keep inside motor 30 any oil leaking from pump 20 includes a glass-shaped (or cup-shaped, or can-shaped) jacket 250, similar to jacket 150 and intended to provide, over jacket 150 shown in FIG. 5, the same improvement as provided by the use of component 90 in pumping system 200 shown in FIG. 4.

Like jacket 150, jacket 250 has a side wall 251 consisting of a thin resin layer located in the air gap between stator 32 and rotor 33 of motor 30, and two bases 180, 190, having a larger diameter than side wall 251, so that said bases protrude radially outwards from side wall 251. Jacket 250 differs from jacket 150 shown in FIG. 5 only in respect of the configuration of base 190, which, instead of having a flat external surface, like base 170 of jacket 150, has an external surface 194 with conical profile (more particularly, shaped as a frustum of a cone), such that surface 194 projects outside motor casing 31. Moreover, cooling fins 196 are formed on the portion of surface 194 located outside casing 31.

Base 190 having a surface 194 partly coming out from motor casing 31 allows a better thermal dissipation than base 170 wholly accommodated inside motor casing 31, since base 190 can directly receive the air flow created by the external cooling system (not shown) of pumping system 300. The provision of cooling fins 196 in the portion of surface 194 outside motor casing 31 allows increasing the cooling surface and having a more effective circulation of the external cooling air flow.

It is to be appreciated that, when pouring the resin for forming the first and second components 60, 70 and 80, 90 of FIGS. 3 and 4 or jackets 150 and 250 of FIGS. 5 and 6, some resin could become incorporated between the magnets of motor stator 32. In view of this fact, the embodiment shown in FIGS. 3 and 4 could even be interpreted as a limit case of the embodiment shown in FIGS. 5 and 6, where the resin layer forming side walls 151, 251 of jackets 150, 250 has a substantially zero thickness.

Of course, while leaving the principle of the invention unchanged, the embodiments and the construction details can be widely changed with respect to what has been described and shown by way of non-limiting example only, without thereby departing from the scope of the invention as defined in the following claims.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. An oil-lubricated vacuum pumping system, comprising:

an oil-lubricated vacuum pump comprising a stationary pump stator and a rotatable pump rotor cooperating for pumping a fluid from a pump inlet to a pump outlet;

a motor comprising a motor casing housing a stationary motor stator and a rotatable motor rotor cooperating for driving in rotation the pump rotor by a drive shaft having a first axial end, and a second axial end axially opposite the first axial end, the first axial end being nearer to the oil-lubricated vacuum pump than the second axial end, wherein:

the motor stator and the motor rotor are separated by an air gap surrounding the motor rotor; and the motor casing comprises a casing axial wall surrounding the motor stator, and a casing end wall comprising a casing end wall inside surface facing the motor rotor; and an oil-tight jacket separate from the motor casing and enclosing at least a portion of the motor rotor, and forming a container configured to collect and keep oil inside the motor and to prevent the oil from leaking from the motor into an environment outside the motor, wherein the oil-tight jacket is composed of an oil-resistant, electrically insulating thermosetting or thermoplastic resin, and comprises:

a portion of the motor stator poured with the resin;

a resin layer forming a side wall of the container located in the air gap; and a resin layer forming a base of the container located axially adjacent to the second axial end and extending radially outwards from the side wall relative to the drive shaft, wherein the base comprises a base outer surface facing the casing end wall inside surface, and the oil-tight jacket is open at the first axial end and closed at the second axial end.

2. The oil-lubricated vacuum pumping system according to claim 1, wherein the drive shaft extends between the motor and the oil-lubricated vacuum pump without a dynamic seal.

3. The oil-lubricated vacuum pumping system according to claim 1, wherein:

the oil-lubricated vacuum pump comprises a pump casing defining the pump stator and housing the pump rotor;

the pump casing comprises a pump casing surface facing the motor and comprising a pump casing recess;

the base located axially adjacent to the second axial end is a second base, and the oil-tight jacket further comprises a first base positioned nearer to the oil-lubricated vacuum pump than the second base, the first base and the second base each radially extending towards the motor casing;

the first base is clamped between the pump casing and the motor casing, and is clamped between the motor stator and the motor casing; and the first base comprises a first base surface, at least a portion of the first base surface being shaped complementarily with the pump casing recess and engaging the pump casing recess in an oil-tight manner.

4. The oil-lubricated vacuum pumping system according to claim 3, wherein the first base and the second base each have a larger diameter than the side wall and protrude radially outwards from the side wall.

5. The oil-lubricated vacuum pumping system according to claim 3, wherein the first base comprises a first annular axial recess, the second base comprises a second annular axial recess facing the first annular axial recess, and the first annular axial recess and the second annular axial recess respectively accommodate opposite axial ends of the motor stator, and wherein the first annular axial recess and the second annular axial recess each are radially delimited towards the outside of the motor by an axially projecting edge located between the motor stator and the motor casing, and are radially delimited towards the inside of the motor by a thickened end portion of the side wall.

6. The oil-lubricated vacuum pumping system according to claim 3, wherein the second base is wholly received inside the motor casing.

7. The oil-lubricated vacuum pumping system according to claim 3, wherein:

the first base comprises a first disc-shaped component and the second base comprises a second disc-shaped component, the first disc-shaped component and the second disc-shaped component accommodating opposite axial end portions of both the motor stator and the motor rotor;

the first disc-shaped component is clamped between the pump casing and the motor casing; and the first disc-shaped component comprises the first base surface.

8. The oil-lubricated vacuum pumping system according to claim 7, wherein the first disc-shaped component comprises a first annular axial recess, the second disc-shaped component comprises a second annular axial recess facing the first annular axial recess, and the first annular axial recess and the second annular axial recess accommodate opposite axial ends of the motor stator, and wherein the first annular axial recess and the second annular axial recess each are radially delimited towards the outside of the motor by an axially projecting edge located between the motor stator and the motor casing, and are radially delimited, towards the inside of the motor, by a thickened end portion of the side wall.

9. The oil-lubricated vacuum pumping system according to claim 7, wherein the second disc-shaped component is wholly received inside the motor casing.

10. The oil-lubricated vacuum pumping system according to claim 3, wherein the first base comprises a central opening through which the drive shaft extends.

11. The oil-lubricated vacuum pumping system according to claim 10, comprising a first end wall positioned at the first axial end in the central opening, and a second end wall axially opposite the first end wall, wherein the first end wall and the second end wall at least partially define a rotor chamber in which the motor rotor is disposed.

12. The oil-lubricated vacuum pumping system according to claim 11, wherein the first base is clamped between the motor stator and the first end wall.

13. The oil-lubricated vacuum pumping system according to claim 11, wherein the second end wall is at least partially surrounded by the second base.

14. The oil-lubricated vacuum pumping system according to claim 1, wherein:

the oil-lubricated vacuum pumping system further comprises a first end wall positioned axially between the motor rotor and the oil-lubricated vacuum pump, and a second end wall axially opposite the first end wall, wherein the motor rotor is disposed axially between the first end wall and the second end wall;

the motor casing has a first interior space radially between the motor stator and the first end wall, and a second interior space radially between the motor stator and the second end wall; and the oil-tight jacket completely occupies the first interior space and the second interior space.

* * * * *